April 6, 1948.  A. G. SILVESTER  2,439,273
TURBO-JET ENGINE FOR AIRCRAFT PROPULSION
Filed March 20, 1944

Inventor:
Austin G. Silvester,
by Harry E. Dunham
His Attorney.

Patented Apr. 6, 1948

2,439,273

UNITED STATES PATENT OFFICE 2,439,273

TURBO-JET ENGINE FOR AIRCRAFT PROPULSION

Austin G. Silvester, Danvers, Mass., assignor to General Electric Company, a corporation of New York Application March 20, 1944, Serial No. 527,159

1 Claim. (Cl. 60—35.6)

The present invention relates to aircraft power plants and especially to power plants which function to effect travel of the aircraft by means of a jet of gas discharged into the atmosphere. This is termed usually jet propulsion.

The object of my invention is to provide an improved construction and arrangement of jet propulsion aircraft power plant, and for a consideration of what I believe to be novel and my invention, attention is directed to the following specification and to the claim appended thereto.

Figure 1:
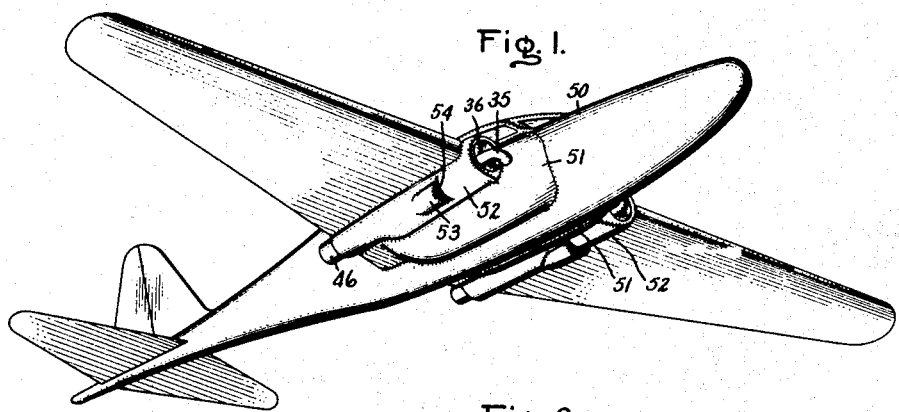
Figure 2:
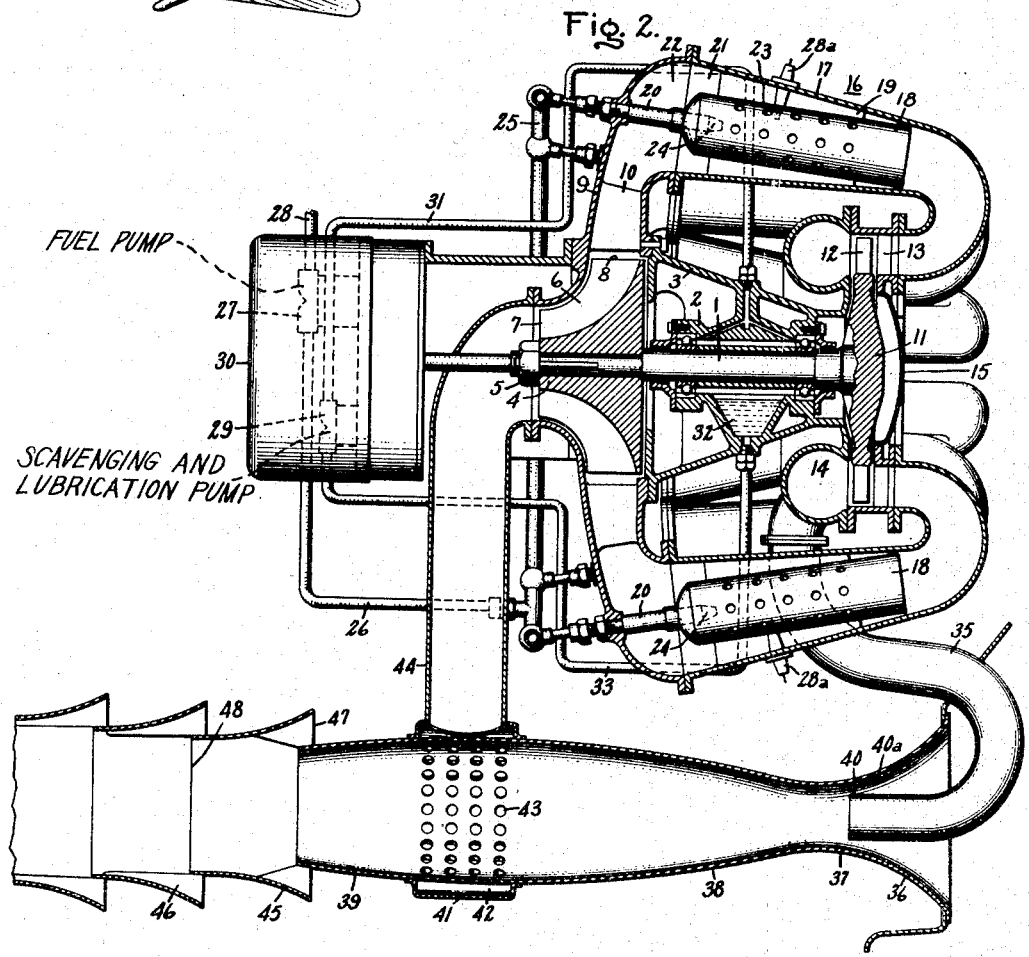

In the drawing, Fig. 1 is a perspective view of an aircraft equipped with two power plants embodying my invention, and Fig. 2 is a sectional view through one of the power plants.

Referring first to Fig. 2, 1 indicates a shaft mounted in a suitable bearing structure 2, the bearing being enclosed in a bearing housing 3. In the present instance, the bearing structure comprises two ball bearings spaced axially at opposite ends of the bearing housing. Mounted on the left hand end of shaft 1 is an impeller 4 of a centrifugal compressor, the impeller being held in place on the shaft by a nut 5. The vanes of the impeller are indicated at 6, the inlet to the vanes is indicated at 7, and the discharge ends of the vanes are indicated at 8. Surrounding the impeller are walls which define a diffuser 9, the curved vanes of the diffuser being indicated at 10. This is a known type of centrifugal compressor and is to be taken as typical of any suitable compressor arrangement.

On the other end of shaft 1 is mounted a turbine wheel 11 on the rim of which is a ring of turbine buckets 12. Adjacent to the entrance side of the ring of turbine buckets 12 is a ring of nozzles 13 for directing actuating fluid to the turbine buckets. The exhaust from the turbine buckets is discharged to an annular exhaust chamber 14. In front of the turbine wheel there is mounted a disk 15 which functions as a shield to protect the turbine wheel from the heat of adjacent parts.

Surrounding the compressor and turbine and suitably supported on the casings of the compressor and turbine are a series of combustion units or chambers 16. The combustion units or chambers are spaced circumferentially relatively to each other and may comprise any suitable number. Each combustion unit comprises an outer circular tapered casing wall 17 within which is mounted a burner tube 18 of suitable diameter, it being supported in spaced relation to outer casing wall 17 by suitable means such as, for example, the spacing clips 19 which support its right hand end and the fuel tube 20 which supports its left hand end. Between casing wall 17 and burner tube 18 is an annular space 21 to which a mixture of air and gas under pressure is supplied from the compressor by way of a suitable passage 22. In the burner tube 18 are openings 23 for flow of air from chamber 21 to the interior of the burner tube. Projecting through the end head of burner tube 18 is a suitable fuel nozzle 24 to which fuel is supplied through fuel tube 20. The fuel tubes 20 of the several burners are connected to an annular supply pipe 25 which in turn is supplied with fuel through a fuel pipe line 26 which connects with the discharge side of a suitable pump 27 driven through gearing (not shown) connected with shaft 1. The suction inlet of pump 27 is connected by a pipe line 28 to a suitable fuel supply tank. Each combustion unit may be provided with an ignition plug 28a for use in starting. The combustion unit illustrated is shown only diagrammatically. Preferably, I employ a unit of the type more specifically disclosed in the application of Anthony J. Nerad, Serial No. 501,106, filed September 2, 1943, and assigned to the same assignee as the present invention. At 29 is a combined lubricating pump and scavenging pump, it being in substance two pumps built into a single casing. The lubricating pump takes lubricant from a suitable source of supply which may be in the housing 30 which encloses the pumps and delivers it through a pipe line 31 to the bearings through the passages indicated in the bearing housing. Oil from the bearings accumulates in a sump 32 from which it is pumped by the scavenging pump back to the supply chamber through a suction pipe line 33. Casing 30 may contain also suitable auxiliaries for the turbo compressor set such as a starting motor and a generator (not shown).

The gases discharged to exhaust chamber 14 are conveyed by a suitable conduit 35 to a thermal jet pump comprising a combined injector, diffuser and a jet discharge nozzle. The injector comprises an outwardly curved wall 36 which faces in the direction of motion of the aircraft and which terminates in a throat 37. Beyond throat 37 as regards the direction of flow through the structure is an outwardly tapering wall which forms a diffuser 38 and beyond diffuser 38 is an inwardly tapering wall which forms a discharge nozzle 39. Conduit 35 terminates in a discharge nozzle 40 located at the throat 37, and in spaced relation to the wall of the throat to define an annular air admission passage 40a. It will be seen that curved wall 36, throat 37 and diffuser 38 form in substance a Venturi tube. Surrounding diffuser 38 at its discharge end is a wall 41 which defines an annular chamber 42 surrounding the diffuser. Chamber 42 is connected to the interior of the diffuser by a series of rows of spaced holes 43, this forming in substance a screen separating chamber 42 from the diffuser. Chamber 42 is connected to the inlet of impeller 4 by a conduit 44.

In connection with discharge nozzle 39, I may provide an augmenter comprising a series of bell mouthed augmenter tubes 45 connected to each other and to the end of discharge nozzle 39 by suitable webs 46. The tubes 45 are nested as shown, the bell-shaped mouths of tubes 45 facing in the direction of motion; and each is adapted for flow of air from its forward or entrance end 47 to its discharge end 48. Nozzle 39 discharges into the first of the augmenter tubes and it in turn discharges into the next following augmenter tube. Any suitable number of successive augmenter tubes may be used, three being shown in the present instance.

One or more units, as shown in Fig. 2, may be suitably mounted on an aircraft for effecting travel of the aircraft by jet propulsion. In the present instance, I have shown in Fig. 1 two such units, one on each side of the fuselage 50 of an aircraft. The power plant proper, including the power plant turbo-compressor unit, may be mounted in a suitable nacelle 51 on the side of which is a wall 52 which includes the structure comprising the injector, the diffuser, the discharge nozzle and the jet augmenters. The conduit 35 extends out through wall 51 and projects into the ejector, as shown in Fig. 1. At 53 is a wall which defines an opening 54 which faces in the direction of motion and through which air is supplied to the jet augmenters. It will be understood that the arrangement in any particular case depends upon the structure of the aircraft and the number of power units to be mounted thereon.

When the power plant is in operation, the aircraft being propelled through the air, air is rammed into the funnel-shaped inlet 36 of the Venturi tube. Its flow is augmented by gases discharged from the end 40 of conduit 35 which gases are discharged at considerable velocity. The mixture of gases and air which flows through throat 37 enters the diffuser 38 at high velocity and in the diffuser its velocity is converted into pressure to a considerable extent. For example, about 90% of the velocity may be converted into pressure. Accordingly, there is provided at the larger portion of diffuser 38 where chamber 42 is formed, a region of higher pressure. At this region is a mixture of air and turbine exhaust gases. Some of the air and gases pass through openings 43 to chamber 42 from which they are conveyed through conduit 44 to the impeller. From the impeller, the mixture of air and gases is supplied to the several combustion units 16. Here, fuel is supplied to the mixture of air and gases which is burned and the products of combustion supplied to the buckets 12 of the turbine wheel through the nozzles 13. The portion of the mixture of air and gases not taken by the compressor (and this may represent the major portion) is discharged through the tapered discharge nozzle 39 directly to atmosphere to effect jet propulsion of the aircraft in a well understood manner.

In the operation of a combustion chamber, as shown, there is provided always a large excess of air. Accordingly, the gases which are mixed with the air supplied to the burners do not affect adversely combustion in the combustion chamber, there being still ample oxygen for complete combustion. At the same time, the temperature of the gases entering the compressor are relatively low in temperature.

With the above-described arrangement, the mixture of air and gases supplied to the impeller 4 is at a pressure well above atmospheric pressure. This means that the compressor does not have to do as much work as would be the case were the supply to it at atmospheric pressure. Accordingly, a smaller compressor and a smaller turbine may be used because the impeller has to do less work in bringing the substance pumped by it up to the desired pressure for use in the burners.

Viewed from one aspect, it may be considered that I have a two-stage compressor, the first stage being in the form of a jet compressor actuated by the gases discharged from the turbine wheel and the second stage being in the form of a compressor driven by the turbine wheel which in turn is actuated by gases from the combustion units. In other words, the gases from the combustion units are utilized first in a turbine wheel to drive a compressor, then in a jet injector to initially compress air to be supplied to the inlet of the compressor operated by the turbine and then used as a propulsion means for the aircraft.

What I claim as new and desire to secure by Letters Patent of the United States is:

In a gas turbine powerplant for the jet propulsion of aircraft, the combination of a turbo-compressor including a compressor impeller and a turbine rotor mounted on a common shaft arranged substantially parallel to the direction of flight with the turbine rotor at the forward end thereof, a combustion chamber arranged substantially axially of the turbo-compressor and adapted at its rearward portion to receive fluid from the compressor and to deliver hot gases to the turbine rotor from the forward end thereof, and a thermal jet pump actuated by the hot gases discharged from the turbine, said jet pump including an elongated housing of circular cross-section having a flared air inlet portion open to the atmosphere and facing forward in the direction of flight, said housing also defining a constricted throat portion, an expanding diffusing portion and a rearwardly directed propulsion nozzle in series flow relation with the air inlet portion, nozzle means supported in said constricted throat portion and directed rearwardly, conduit means for conducting gases discharged from the turbine to said nozzle means, said jet pump housing having a perforated portion in the high pressure region intermediate the diffusing portion and the propulsion nozzle, and conduit means surrounding said perforated portion and adapted to conduct fluid from said high pressure region to the inlet of said compressor impeller, whereby the jet pump provides a first stage of compression in series with the compressor and also forms a main propulsion nozzle.

AUSTIN G. SILVESTER.

REFERENCES CITED

The following references are of record in the file of this patent:

UNITED STATES PATENTS

| Number | Name | Date |
|---|---|---|
| 1,182,665 | Eynon et al. | May 9, 1916 |
| 2,168,726 | Whittle | Aug. 8, 1939 |

FOREIGN PATENTS

| Number | Country | Date |
|---|---|---|
| 299,420 | Great Britain | May 15, 1930 |